Figure 2:
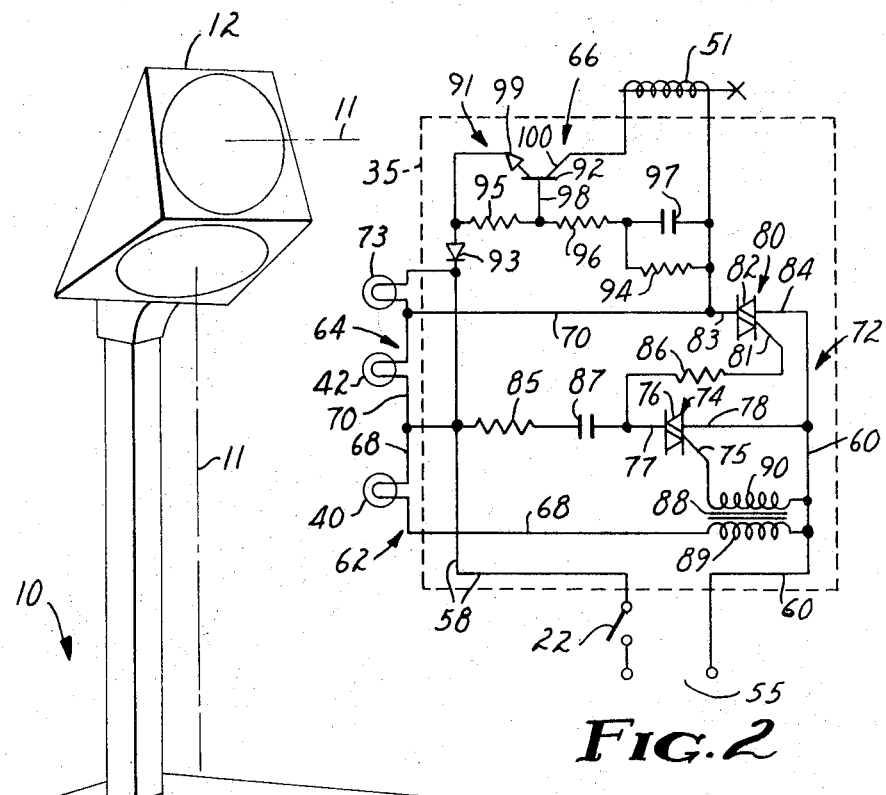

United States Patent

[11] 3,562,580

| [72] | Inventors | Jack P. Blomgren<br>Maplewood;<br>Stanley L. Ross, White Bear; Peter A. Lind,<br>Minnetonka, Minn. |
|---|---|---|
| [21] | Appl. No. | 790,279 |
| [22] | Filed | Jan. 10, 1969 |
| [45] | Patented | Feb. 9, 1971 |
| [73] | Assignee | Minnesota Mining and Manufacturing Company<br>St. Paul, Minn.<br>a corporation of Delaware |

[54] LAMP FAILURE DETECTION AND CHANGE DEVICE
9 Claims, 2 Drawing Figs.

[52] U.S. Cl. ................................................ 315/88, 315/93
[51] Int. Cl. .................................................... H05b 39/10, H05b 41/46
[50] Field of Search ........................................ 315/88, 93

[56] References Cited
UNITED STATES PATENTS

| 1,700,226 | 1/1929 | House | 315/93X |
| 1,987,532 | 6/1935 | Koito | 315/93X |
| 3,457,453 | 7/1969 | Campbell | 315/88 |
| 3,471,745 | 10/1969 | Meyer | 315/88 |
| 2,892,966 | 6/1959 | Smyth | 315/89 |
| 3,146,375 | 8/1964 | Campbell | 315/89 |

Primary Examiner—Robert Segal
Attorney—Kinney, Alexander, Sell, Steldt & Delahunt ABSTRACT: A device for use in a light projector to automatically replace an expired main lamp with a spare lamp. The main lamp and the spare lamp are socketed in a lamp-changing mechanism which is actuated in response to the operation of a solid-state lamp-failure detector. The detector senses the failure of the main lamp and automatically energizes the spare lamp, an indicating lamp and a release means to permit the lamp changing mechanism to remove the main lamp from a focus position in the projector and advance said spare lamp into the focus position.

PATENTED FEB 9 1971  3,562,580

INVENTORS
JACK P. BLOMGREN
STANLEY L. ROSS
PETER A. LIND
BY Kinney, Alexander,
Sell, Steldt & De La Hunt
ATTORNEYS

LAMP FAILURE DETECTION AND CHANGE DEVICE

BACKGROUND OF THE INVENTION

Educators, instructors and lecturers of all types have adopted the use of light-projecting devices such as slide projectors, movie projectors, and overhead projectors to dramatically and effectively present their subject matter to an audience. While it is desirable to be able to interrupt the picture series for the purpose of discussion and explanation it is obviously undesirable to experience an unplanned exasperating interruption of the visually aided lecture by having the projector's lamp burn out during a lecture using projected transparencies. Also, hazards associated with other light projectors such as street lights and traffic signal lights, which generally utilize a lens system and a focus position to properly locate a lamp, could be minimized by ensuring a continuance of illumination after a first lamp has expired.

SUMMARY OF THE INVENTION

The present invention relates to a light projector having a device for detecting the failure of the main lamp, automatically energizing a spare lamp and physically replacing the expired main lamp with the spare lamp, and in one aspect, to a lamp failure detector having solid-state electrical switching means and mechanical means for moving the main lamp out of the focus position and moving the spare lamp into the focus position for continuation of the light projection with the minimum of interruption.

This device, therefore, detects the failure of the main lamp within a light-projecting device such as a slide projector, movie projector or overhead projector and automatically replaces the expired main lamp with a spare lamp for continuation of the program with a minimum of interruption.

This device, also, detects the failure of a main lamp within a light projecting device such as a traffic signal light and automatically replaces the expired main lamp with a spare lamp to minimize hazards associate with such a failure.

The lamp failure detector includes solid-state devices that will react to the failure of the main lamp and quickly activate the release means.

The lamp failure detector further includes electronic switching to provide energy to the spare lamp, indicating lamp and solenoid without the utilization of high current carrying electrical contacts.

Figure 1:
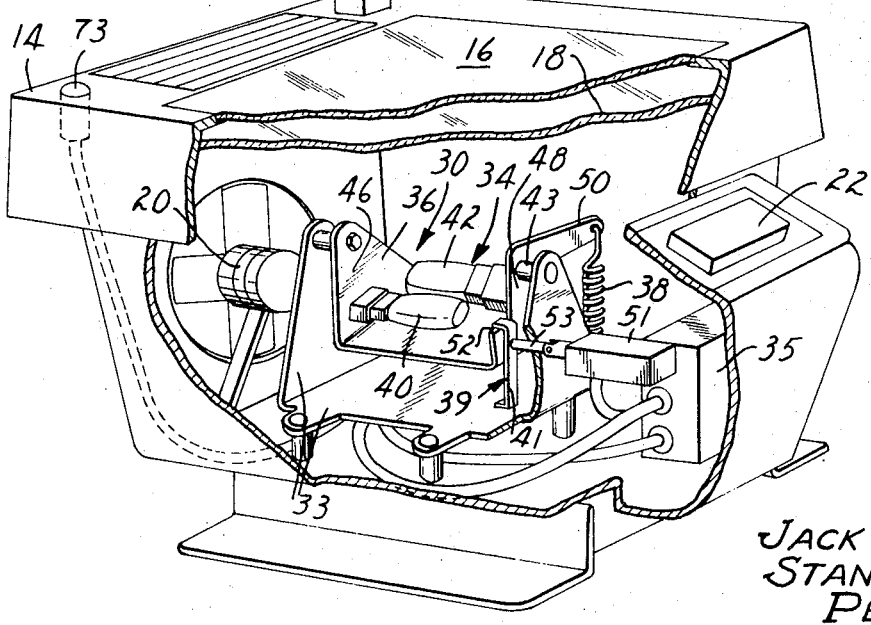

Other uses and many of the attendant advantages of this invention will be readily understood and appreciated as the same becomes better understood by reference to the following detailed description when considered in connection with the accompanying drawing in which like numerals designate like parts throughout the FIGS. and detailed description and wherein:

FIG. 1 is a perspective view, partly in section, of an overhead projector utilizing the teachings of the present invention; and FIG. 2 is a schematic design illustrating a solid-state lamp-failure detector.

In the drawing and in the following description, an embodiment of the invention is illustrated and described in combination with an overhead projector shown in FIG. 1. The end of the projector shown at the right will be referred to as the "front" of the projector and the opposite end will be referred to as the "back." The portion of the projector which is uppermost in FIG. 1 comprises the "upper" portion of the projector and the opposite portion therefrom is called the "bottom" of the projector. The main lamp 40, as shown in FIG. 1, is located in the "focus position" which is the proper focal length from the condensing lens of the Fresnel type and along the optical centerline 11 of the projector.

The overhead projector, generally designated 10, comprises a projection head 12 vertically supported by the lower boxlike case or base structure 14. The base structure 14 comprises a glass stage 16 on which the transparency is placed, a Fresnel lens 18 to properly focus the illumination from the projector's lamp, a motor 20 and a set of fan blades driven thereby to cool the projector, an operating switch 22, and a device 30 for detecting the failure of a main lamp 40 and for automatically replacing the expired main lamp with a spare lamp 42 at the focus position.

The device 30 comprises, in combination, a frame 33 for supporting a lamp changing mechanism 34 and a solid-state lamp-failure detector 35 for sensing and reacting to the failure of the main lamp 40.

The lamp changing mechanism 34 comprises a rotatable lamp support 36 pivotably mounted on the frame 33 by pivots 43, an actuation means including a biased spring 38 and release means 39 operatively connected to the lamp support 36 to permit the actuation means to move the lamp support 36 from a first set position wherein the main lamp 40 is in the focus position to a second set position wherein the spare lamp 42 is in the focus position of the projector 10. The lamp support 36 includes a rear vertical wall 46 and a front vertical wall 48 having an arm 50 operably engaging the spring 38 and a step 52 to operably engage the release means 39. The release means 39 includes a leaf spring 41, rigidly secured to the frame 33, which engages the step 52, an electrically actuated solenoid 51 and a connecting shaft 53 rigidly secured to the spring 41 and pivotably secured to the core of the solenoid 51. Thus, when the solenoid 51 is electrically energized the spring 41 is outwardly biased to disengage the step 52, the biased spring 38 will rotate the support 36 to the second set position against a stop (not shown) to position the spare lamp 42 in the focus position of the projector 10. When the solenoid 51 is electrically deenergized, the biased spring 41 will return the release means 39 and if the lamp support 36 is in the second set position the rear edge of the spring 41 will merely abut the wall 48. Upon returning the support 36 to the first set position, the biased spring 41 will again engage the step 52 to maintain the support 36 in the first set position. The main lamp 40 and the spare lamp 42 may be detachably socketed to the same wall or to separate walls as illustrated in FIG. 1.

The source 55 of electrical energy may vary between 105- —130 volts, as is commonly experienced between industrial and nonindustrial areas, and between 50 to 60 cycles per second which are the normal power line frequencies in Europe and United States, respectively. The source 55 is electrically connected to the detector, via switch 22, by a supply conductor 58 and a ground conductor 60.

The lamp failure detector 35, as schematically illustrated in FIG. 2, comprises a first circuit 62, a second circuit 64 and a third circuit 66. The first circuit 62 includes lines 68, 68 and the main lamp 40. The second circuit 64 includes lines 70, 70 and the spare lamp 42. A first switch means 72, which is operatively connected to the first circuit 62 and the second circuit 64, senses an electrical opening within the first circuit 62 and reacts to this sensation to connect the second circuit 64 to the source 55 of electrical energy, via lines 58 and 60, to illuminate the spare lamp 42, energize the release means 39 and illuminate the indicating lamp 73. The first switch means 72 includes a first thyristor 74 having a first gate lead 75 and a first pellet portion 76 including a first high lead 77 and a first common lead 78, a second thyristor 80 having a second gate lead 81 and a second pellet portion 82 including a second high lead 83 and a second common lead 84, a first resistor 85 and a second resistor 86, a first capacitor 87 and a coupling means shown as a current transformer 88 to operatively connect the first circuit 62 to the second circuit 64.

The primary winding 89 of the current transformer 88 is electrically in series circuit with the main lamp 40. The secondary winding 90 of the transformer 88 is electrically in series circuit with the first gate lead 75. The first common lead 78 is connected to the ground conductor 60 and the first high lead 77 is connected in series with an impedance means which includes the first resistor 85 and first capacitor 87. The second gate lead 81 is electrically connected, via the second resistor 86, to the first high lead 77. The second common lead 84 is connected to the ground conductor 60 and the second high lead 83 is connected in series with the spare lamp 42. Thus, the current induced in the secondary 90 of the transformer 88 electrically closes the first pellet portion 76 and permits a small amount of current, limited by the high impedance means, to flow through the first pellet portion 76. The second resistor 86, in the circuit of the second gate lead, inhibits current from flowing through the second gate lead 81 when the first thyristor 74 is electrically closed, acting as a dead-short. When the first circuit 62 becomes electrically open, as for example when the filament of the main lamp 40 burns out, the coupling means will stop inducing a current to flow through the gate 75 of the first thyristor 74 and thus the first thyristor 74 will become electrically open to stop any current flow therethrough. The opening of the first thyristor 74 diverts the current to flow through the second gate lead 81 of the second thyristor 80 and electrically close the second thyristor 80. The closing of the second thyristor 80 will cause the spare lamp 42 to illuminate, the indicating lamp 73 to illuminate and energization of the solenoid 51 which will release the lamp support 36 to permit the actuation means to move the support 36 from the first set position to the second set position. The impedance means includes capacitive reactance to cause the current therethrough to lead the voltage. Thus, the current in the second gate lead 81 will close the second thyristor 80 before the start of a voltage cycle across the second high lead 83 and the second common lead 84. This controlled phase shift affords similar illumination of the spare lamp 42 relative to main lamp 40.

A relatively large solenoid having high voltage and current carrying capacity could be connected in parallel to the spare lamp 42, to the exclusion of the third circuit, and maintained in the energized-retracted position during the utilization of the spare lamp 42. Such a solenoid, however, would be constantly energized during utilization of the spare lamp and could be objectionable as to physical size within a relatively compact projector.

The third circuit 66 has been imposed between the second circuit 64 and the solenoid 51 to include a second switch means 91 for electrically opening the third circuit 66 to deenergize the solenoid 51 upon expiration of a duration of time from said first switch means 72 connecting said second circuit 64 to the source 55 of the electrical energy. The second switch means 91 includes a NPN transistor 92, a diode 93, a third resistor 94, a fourth resistor 95, a fifth resistor 96, and a second capacitor 97. The transistor 92 has a base 98, emitter 99 and collector 100 wherein the emitter 99 and collector 100 are electrically in series circuit with the solenoid 51. The diode 93 is electrically connected in series circuit with the emitter 99 to polarize the power through the transistor 92. The fourth resistor 95, operates to DC bias the transistor 92 for proper conduction. The fourth and fifth resistors 95, 96 cooperate with the second capacitor 97 to afford a RC time constant to charge the capacitor 97. Thus, when the second thyristor 80 is electrically closed the solenoid 51 is energized through the transistor 92. After approximately five AC cycles, the second capacitor 97, electrically connected to the base 98 and parallel to the collector 100 and solenoid 51 charges the base 98 to approach the potential of the emitter 99 for commutation of the transistor 92 to thereby interrupt the current flow through the solenoid 51. As long as the spare lamp 42 is being utilized, the charged capacitor 97 will continue to commute the transistor 92. Once the expired main lamp 59 has been physically replaced with a new lamp, wherein the lamp support 36 would be reset to the first set position, the charged capacitor 97 must be discharged to reset the transistor 92. The third resistor 94 bleeds-off the charged capacitor 97 and thus resets the transistor 92.

The NPN transistor 92 could be replaced by a PNP transistor wherein the electrical direction of the diode 93 must be reversed. Also, the first and second bidirectional thyristor 74, 80, respectively, could be replaced by unidirectional thyristors.

The following are typical values of elements in the embodiment of FIG. 2:

| Component | Value |
|---|---|
| A.C. power source 55 | 105—130 volts, 50—60 cycle |
| NPN transistor 92 | 200 $V_{ceo} H_{fe}$=10—30 I=1 amp. |
| First thyristor 74 | 1.6 amp, 200 volt |
| Second thyristor 80 | 10 amp, 200 volt |
| First resistor 85 | 1 Kohms |
| Second resistor 86 | 2.2 Kohms |
| Third resistor 94 | 10 Kohms |
| Fourth resistor 95 | 4.7 Kohms |
| Fifth resistor 96 | 4.7 Kohms |
| First capacitor 87 | 1 $\mu f$. |
| Second capacitor 97 | 0.5 $\mu f$. |
| Diode 93 | 1 N4 0 03 |
| Solenoid 51 | Electro Mechanisms, Inc. SP-37 |
| Current transformer | Mag. Con. MC-2853 |
| Main Lamp 40 | 120 volt, 500 Watt |
| Spare Lamp 42 | 120 Volt, 500 Watt |
| Indicating Lamp 73 | 120 Volt, Neon |

I claim:

1. A device having particular utility in a light projecting system for detecting the failure of a main lamp and automatically replacing the expired main lamp with a spare lamp, said device comprising in combination;
   1. a frame;
   2. a lamp changing mechanism having
      a. a movable lamp support mounted on said frame for movement from a first set position to a second set position;
      b. a main lamp and a spare lamp mounted on said lamp support to position said main lamp in a predetermined position when said support is in said first set position and to position said spare lamp in said predetermined position when said support is in said second set position;
      c. actuation means operatively connected to said support for moving said spare lamp support between said first set position and said second set position;
      d. release means operatively connected to said movable lamp support for releasing said support to permit said actuation means to move said lamp support from said first set position to said second set position;
   3. a lamp failure detector having
      a. a first circuit including said main lamp;
      b. a second circuit including said spare lamp and electrically connected to said release means;
      c. first switch means operatively connected to said first circuit and said second circuit for sensing an electrical opening within said first circuit and for connecting said second circuit to a source of electrical energy to afford energization of said spare lamp and said release means to permit movement of said lamp support, said first switch means including
         1. coupling means operatively connected to said first circuit and said second circuit for producing a current flow through a portion of said second circuit when current is flowing through said first circuit; and
         2. a first thyristor operatively connected to said second circuit and having a first gate lead, and a pellet portion having a first common lead and a first high lead, said first gate lead electrically connected to said coupling means to maintain said pellet portion electrically closed when current is flowing through said first circuit.

2. The device according to claim 1 wherein said release means includes an electrical solenoid electrically connected to said second circuit for activating said actuation means upon operation of said first switch means.

3. The device according to claim 2 wherein said solenoid is connected to said second circuit by a third circuit, said third circuit including second switch means for opening said third circuit to deenergize said solenoid upon expiration of a duration of time from said first switch means connecting said second circuit to the source of electrical energy.

4. The device according to claim 3 wherein said second switch means includes:
   a. a transistor having a base, emitter and collector, said emitter and collector electrically in series circuit with said solenoid;
   b. a diode electrically connected in series with said emitter to polarize the power through said transistor; and
   c. a second capacitor electrically connected to said base and parallel to said series collector and solenoid for charging said base toward the potential of said emitter for commutation of said transistor and thus interrupt the current flow through said solenoid after a duration of time.

5. The device according to claim 4 wherein said second switch means includes a third resistor electrically connected in parallel to said second capacitor to bleed off the charge on said second capacitor to terminate the commutation of said transistor upon interruption of electrical energy to said device and thus reset said transistor.

6. The device according to claim 5 wherein said second switch means includes a fourth resistor electrically connected between said base and said emitter for biasing said transistor.

7. The device according to claim 6 wherein said device includes indicator means electrically connected in parallel with said spare lamp for providing a visual indication when said spare lamp is illuminating.

8. The device according to claim 1 wherein said first switch means includes, a second thyristor operatively connected to said second circuit and having a second gate lead and a second pellet portion having a second common lead and a second high lead, said second gate lead electrically connected to said first high lead to maintain said second pellet portion electrically closed, when said first pellet portion is electrically open to afford illumination of said spare lamp and energization of said solenoid.

9. The device according to claim 8 wherein said first switch means includes impedance means electrically connected to said first high lead to minimize the current flowing through said first pellet portion and to maximize the phase shift of the current to lead the voltage through said second gate lead to afford similar illumination of said spare lamp relative to said main lamp.

UNITED STATES PATENT OFFICE
CERTIFICATE OF CORRECTION

Patent No. 3,562,580           Dated February 9, 1971

Inventor(s) Jack P. Blomgren, Stanley L. Ross and Peter A. Lind

It is certified that error appears in the above-identified patent and that said Letters Patent are hereby corrected as shown below:

Column 1, Line 40, delete "associate" and insert --associated--. Column 3, Line 65, delete "59" and insert --40--.

Signed and sealed this 18th day of May 1971.

(SEAL)
Attest:

EDWARD M. FLETCHER, JR.           WILLIAM E. SCHUYLER, J
Attesting Officer                 Commissioner of Patent